(12) United States Patent
Kreitzer

(10) Patent No.: US 6,529,336 B1
(45) Date of Patent: Mar. 4, 2003

(54) COLOR CORRECTED PROJECTION LENSES EMPLOYING DIFFRACTIVE OPTICAL SURFACES

(75) Inventor: Melvyn H. Kreitzer, Cincinnati, OH (US)

(73) Assignee: U.S. Precision Lens Incorporated, Cincinnati, OH (US)

( * ) Notice: Subject to any disclaimer, the term of this patent is extended or adjusted under 35 U.S.C. 154(b) by 0 days.

(21) Appl. No.: 09/831,597
(22) PCT Filed: Nov. 12, 1999
(86) PCT No.: PCT/US99/26645
§ 371 (c)(1), (2), (4) Date: May 11, 2001
(87) PCT Pub. No.: WO00/28353
PCT Pub. Date: May 18, 2000

Related U.S. Application Data

(60) Provisional application No. 60/108,143, filed on Nov. 12, 1998.

(51) Int. Cl.[7] ............ G02B 3/00; G02B 13/18; G02B 3/02; G02B 13/04
(52) U.S. Cl. .............. 359/649; 359/708; 359/714; 359/753
(58) Field of Search ............ 359/648–651, 359/713–716, 753, 782, 784, 788, 708; 348/776, 778, 779, 781

(56) References Cited

U.S. PATENT DOCUMENTS

| | | | |
|---|---|---|---|
| 4,755,028 A | 7/1988 | Moskovich | 359/650 |
| 4,776,681 A | 10/1988 | Moskovich | 359/649 |
| 4,900,139 A | 2/1990 | Kreitzer | 359/649 |
| 5,055,922 A | 10/1991 | Wessling | 348/779 |
| RE35,310 E | 8/1996 | Moskovich | 359/649 |
| 5,619,381 A | 4/1997 | Anderson | 359/677 |
| 5,691,847 A | 11/1997 | Chen | 359/565 |
| 5,822,127 A | 10/1998 | Chen et al. | 359/631 |
| 5,946,142 A | 8/1999 | Hirata et al. | 359/649 |
| 6,014,267 A | 1/2000 | Tsurutani et al. | 359/689 |
| 6,025,959 A | 2/2000 | Moskovich | 359/649 |

FOREIGN PATENT DOCUMENTS

| | | |
|---|---|---|
| EP | 0 517 409 A1 | 12/1992 |
| EP | 1 075 150 A2 | 2/2001 |

OTHER PUBLICATIONS

Warren J. Smith, *Modern Optical Engineering*, Second Edition, McGraw–Hill, Inc., New York, New York, 1990, pp. 372–375.

W.C. Sweatt, "Mathematical Equivalence between a Holographic Optical Element and an Ultra High Index Lens," *Journal of the Optical Society of America*, 69:486–487, 1979.

Primary Examiner—Ricky Mack
(74) Attorney, Agent, or Firm—Maurice M. Klee

(57) ABSTRACT

A projection television system (10) is provided which has a CRT (16) and a projection lens system (13) for forming an image on a screen (14). The projection lens system (13) is characterized by a diffractive optical surface (DOS) which provides color correction for the lens system. The diffractive optical surface (DOS) can be formed as part of a diffractive optical element (DOE) or as part of an existing lens element of the lens system. The diffractive optical surface (DOS) is located between the object side (S2) of the lens' first lens unit (U1) and the image side (S11) of the lens' third lens unit (U3). The distance between the diffractive optical surface (DOS) and the lens' aperture stop (AS) is less than $0.1 \cdot f_0$, where $f_0$ is the focal length of the projection lens (13).

6 Claims, 10 Drawing Sheets

COLOR CORRECTED PROJECTION LENSES EMPLOYING DIFFRACTIVE OPTICAL SURFACES

CROSS REFERENCE TO RELATED APPLICATIONS

This application is the U.S. national phase under 35 USC §371 of International Application No. PCT/US99/26645, filed Nov. 12, 1999, which was published in English under PCT Article 21(2) on May 18, 2000 as International Publication No. WO 00/28353. This application claims the benefit under 35 USC §119(e) of U.S. Provisional Application No. 60/108,143 filed Nov. 12, 1998, the contents of which in its entirety is hereby incorporated by reference.

FIELD OF THE INVENTION

This invention relates to projection lens systems for use in projection televisions and, in particular, to color corrected, wide field of view, high numerical aperture projection lens systems for use with cathode ray tubes (CRTs), including cathode ray tubes having curved faceplates.

BACKGROUND OF THE INVENTION

Various color-corrected high image quality lenses for use in high definition TV displays (HDTV) and in the projection of data and graphics are known in the art. These lenses are most frequently used in "front screen" two piece systems, i.e. systems where the projector and the screen are two different units. As a result of the long distance between the projector and the screen, most of the lenses used in such systems have a half field of view of under 30°.

In recent years, one piece projection TVs have become increasingly popular. These systems utilize a "rear screen" configuration in which the image is projected onto the rear surface of a translucent screen which is combined with the projector into a single unit. To achieve a small overall size for such systems, the lens must have a field of view as wide as possible.

To help achieve this goal and to provide for an increased amount of light at the outer portions of the image, CRTs having curved faceplates are most often used in this application. The faceplates of such CRTs are plano-convex shaped with the phosphor being deposited onto the curved side of the faceplate. As a result, the outer portion of the phosphor side of the faceplate curves towards the lens.

Presenting the CRT image on a surface concave towards the projection lens allows the lens to achieve a half field of view in excess of 40°. However the control of electron beam spot size on a curved phosphor surface is much more difficult than on a flat surface. Spot size control is important since a small and well controlled spot size is required to produce a high quality image.

As long as spot size was fairly large, projection lenses did not need to be corrected for axial color. However, since the introduction of digital TV (e.g., satellite TV and DVD), the quality level of one piece rear projection TV sets for consumer use has been significantly raised.

Manufacturers of such systems are now more willing to use more complicated electronics to minimize and control the size of the spot on a curved phosphor surface, e.g., they are willing to produce spot sizes whose sizes are 0.15 millimeters or less. Consequently, new high quality wide field of view large aperture lenses are needed to compliment the higher quality outputs of curved phosphor CRTs. As with the optics used in data and graphics projection TV systems, these new lenses need to be corrected for color.

A typical color corrected lens used with a flat faceplate CRT consists from long conjugate to short of a front weak aspherical unit, a main power unit which includes a color correcting doublet and a strong positive element having most of the power of the lens, a corrector unit following the main power unit and having at least one aspherical surface, and a strong negative power unit associated with the CRT faceplate and providing most of the correction for the field curvature of the lens. See Kreitzer, U.S. Pat. No. 4,900,139.

From the image side, the main power unit typically has a negative element followed by a positive element of similar focal length but of opposite sign. These two elements provide color correction for the lens and their combined shape is typically meniscus towards the long conjugate. The single positive element providing most of the power of the lens usually follows the color correcting doublet.

Moskovich, U.S. Reissue Pat. No. 35,310, discloses color corrected projection lenses having three lens units wherein each of the first and second units has a positive low dispersion element and a negative high dispersion element.

Co-pending and commonly assigned U.S. patent application No. 09/005,916, filed Jan. 12, 1998, in the name of Jacob Moskovich and entitled "Color Corrected Projection Lenses For Use With Curved Faceplate Cathode Ray Tubes," discloses projection lenses for use with curved CRTs wherein the second lens unit has two positive lens elements at least one of which is at the image side of the lens unit.

The foregoing approaches to achieve color correction have each employed at least one negative lens element of high dispersion which has meant that additional positive power had to be added to the system to compensate for the negative power of the negative element. The additional positive power has taken the form of stronger positive elements or, in many cases, the inclusion of an additional positive element in the system. The incorporation of additional positive and negative elements has increased the cost, complexity, and weight of the lens system. In particular, weight has been increased when the color correction has been achieved using glass elements. The use of glass elements has also meant working with flint glass for the negative high dispersion elements. As known in the art, flint glass is more difficult to work with than crown glass.

SUMMARY OF THE INVENTION

In view of the foregoing, it is an object of the present invention to provide a projection lens system which (1) has a large aperture, i.e., a f/number of about 1.2 or less, (2) has a wide field of view, i.e., a half field of view of at least 35°, (3) provides a high level of correction of both chromatic and monochromatic aberrations when used with cathode ray tubes, including cathode ray tubes having curved faceplates, and (4) achieves chromatic aberration correction with a minimum of additional lens elements and in some cases no additional lens elements.

To achieve these and other objects, the invention provides a projection lens system which from long conjugate to short comprises:

(A) a front lens unit (first lens unit; U1) comprising at least one aspherical element (i.e., an element having at least one aspherical surface), said front lens unit having a short conjugate side (S2 in Tables 1 and 2), (B) a positive power lens unit (second lens unit; U2) which preferably provides the majority of the power of the lens system, (C) a corrector lens unit ($U_{CR}$) comprising at least one aspherical element (i.e., an element having at least one aspherical surface), and (D) a strong negative power unit (third lens unit; U3) associated with the CRT faceplate having a strong concave surface (S11 in Tables 1 and 2) facing the long conjugate and providing most of the correction of the field curvature of the lens, said strong negative power unit having a long conjugate side (S11 in Tables 1 and 2), wherein the lens system includes at least one diffractive optical surface (DOS) which at least partially corrects the axial color of the lens system and which is located between the short conjugate side of the front lens unit and the long conjugate side of the strong negative power unit.

The diffractive optical surface will in general have positive optical power. Accordingly, unlike the use of a high dispersion negative lens element to achieve color correction, the use of a diffractive optical surface does not require the incorporation of additional positive power into the system to balance added negative power. Indeed, the use of a positive diffractive optical surface can allow for at least some reduction in the power of one or more positive elements in the system which, in turn, can facilitate the overall correction of the system's aberrations.

The at least one diffractive optical surface can be a blazed kinoform or a binary approximation to a blazed kinoform and can comprise (1) a surface of a separate optical element (e.g., a diffractive optical element (DOE) which is plano on one side and has a diffractive optical surface on the other), or (2) a surface of an element which forms part or all of the positive power lens unit (U2) or the corrector lens unit ($U_{CR}$).

When formed as part of the positive power lens unit or the corrector unit, the diffractive optical surface provides color correction to the lens system without the need for any additional lens elements. When formed as a surface of a DOE, only one element is required. Accordingly, in either case, the diffractive optical surface of the invention is able to provide color correction for a projection lens system with a minimum increase in the system's complexity, cost, and weight. Although less preferred, multiple diffractive optical surfaces can be used if desired.

BRIEF DESCRIPTION OF THE DRAWINGS

In FIGS. 4 and 5, solid lines represent TAN data, dashed lines represent SAG data, and dotted lines represent SAG-Y data. The wavelengths for the circle, triangle, and square data points are 0.546 microns, 0.1480 microns, and 0.1644 microns, respectively. The H' dimensions given in these figures are in millimeters and the vertical scale is in units of 0.1 millimeters.

Figure 1:
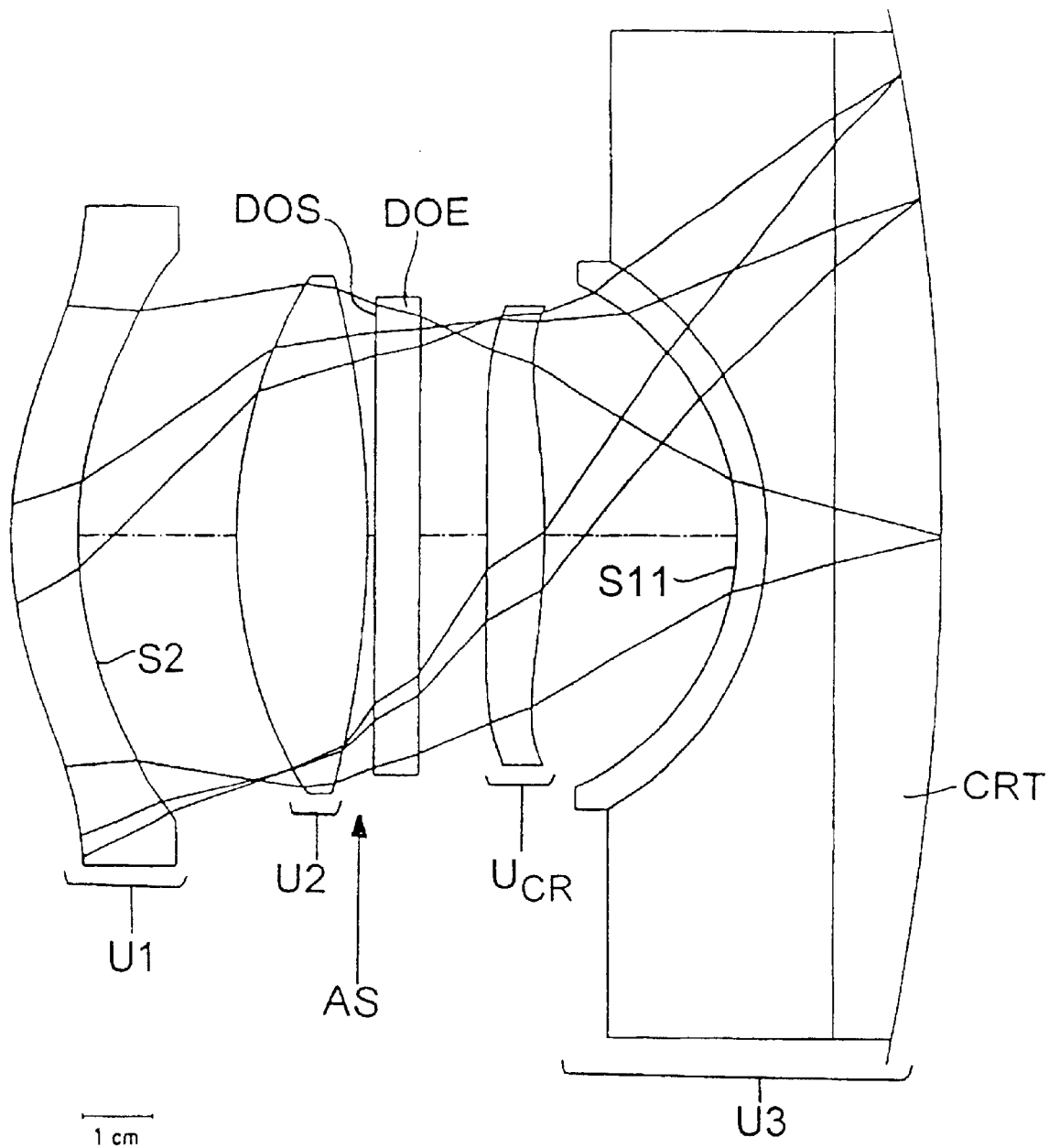
FIGS. 1–2 are schematic side views of lens systems constructed in accordance with the invention.

The foregoing drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The lens systems of the invention preferably include a first lens unit, a second lens unit, a third lens unit, and a corrector lens unit wherein: 1) the first lens unit includes at least one aspherical surface; 2) the second lens unit has a strong positive optical power; 3) the third lens unit corrects for the field curvature of the lens system and has a relatively strong negative optical power; and 4) the corrector lens unit provides correction for, among other things, aberrations due to off-axis rays and has a relatively weak optical power. The systems also include at least one diffractive optical surface for providing at least partial color correction to the lens system.

The first lens unit serves to correct aperture type aberrations, including spherical aberration and coma, and can be composed of one or more lens elements. Preferably, the element or elements of this unit are formed from plastic materials, e.g., acrylic plastics.

The second lens unit preferably provides the majority of the lens system's positive optical power. Although this unit can include multiple lens elements and can have one or more aspherical surfaces, preferably the unit consists of a single glass element having spherical surfaces.

The corrector unit and third lens unit serve to correct off-axis aperture dependent aberrations and field dependent aberrations, respectively. In particular, the corrector unit is effective in dealing with oblique spherical aberrations, while the third lens unit is effective in reducing the system's field curvature.

The corrector lens unit can be composed of one or more lens elements. Preferably, the element or elements of this unit are composed of plastic materials.

The third lens unit is preferably composed of an aspherical plastic lens element which contacts the fluid which couples the lens system to the faceplate of the CRT. If desired, the aspherical plastic lens element of the third lens unit can include an absorptive color filter material in accordance with Wessling, U.S. Pat. No. 5,055,922.

Quantitatively, the ratio of the absolute value of the focal length ($f_1$) of the first lens unit to the overall focal length ($f_0$) of the projection lens is preferably greater than 2.5; the ratio of the focal length ($f_2$) of the second lens unit to the overall focal length of the projection lens is preferably less than 1.5; the ratio of the absolute value of the focal length ($f_{CR}$) of the corrector lens unit to the overall focal length of the projection lens is preferably greater than 2.0; and the ratio of the absolute value of the focal length ($f_3$) of the third lens unit to the overall focal length of the projection lens is preferably less than 2.5.

The diffractive optical surface (DOS) provides at least partial axial color correction for the projection lens. To design a projection lens employing a DOS, the Sweatt model can be used wherein the diffractive surface is treated as a refractive surface having a very large index of refraction (typically 9999) and a V-number of, for example, $_{31}$ 3.4 for lenses which are to be used in the 0.1486 to 0.1656 micron range. See W. C. Sweatt, "Mathematical Equivalence between a Holographic Optical Element and an Ultra High Index Lens," *Journal of the Optical Society of America*, 69:486–487, 1979.

The first order theory of thin lens achromatic doublets is used to calculate the diffractive power required for achromatization. See, for example, Warren J. Smith, *Modern Optical Engineering*, Second Edition, McGraw-Hill, Inc., New York, N.Y., 1990, pages 372–375.

This theory gives the following relationship between the optical power $\Phi_{DOS}$ of the diffractive optical surface, the optical power $\Phi_L$ of the rest of the lens, and $V_L$ and $V_{DOS}$, the Abbe numbers of the average lens glass or plastic (typically about 60) and the diffractive element (e.g., −3.4), respectively:

$$\Phi_{DOS}/\Phi_L = -V_{DOS}/V_L$$

Figure 2:
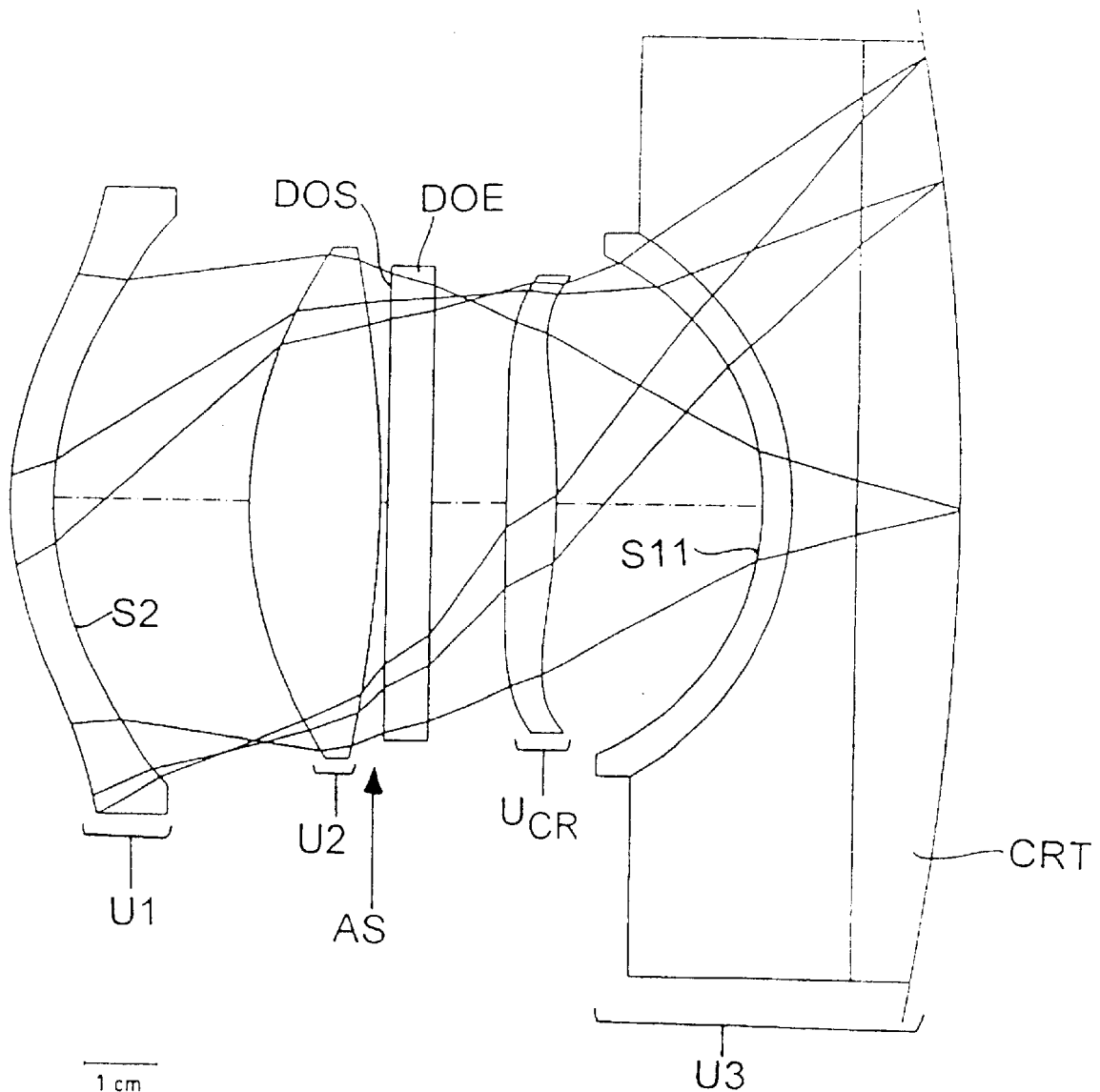

For the lenses of FIGS. 1 and 2, the total optical power which the lenses were designed to provide was approximately 0.1014 mm$^{-1}$. Application of the above formula then gave a value of about 0.10007 mm$^{-1}$ for the power of the diffractive element required to achieve total color correction. Assuming a convex-plano DOE and using a refractive index of 9999, a curvature "c" of about 0.00000007 mm$^{-1}$ for the convex surface was obtained using the relationship:

$$\Phi = (n-1)c$$

where "n" is the index of refraction of the DOE.

In the lenses of FIGS. 1 and 2, an optical power of 0.0005 mm$^{-1}$ for the DOE, rather than 0.0007 mm$^{-1}$, was in fact used. This results in a projection lens which is not totally color corrected but has the benefit of improving the diffractive efficiency of the DOS.

As illustrated in FIGS. 1 and 2, the diffractive optical surface is located between the object side of the first lens unit and the image side of the third lens unit, i.e., between surfaces S2 and S11 in these figures. Preferably, the DOS is located in the vicinity of the projection lens' aperture stop (AS). In particular, for a projection lens having a focal length $f_0$ and a distance "d" between the DOS and the aperture stop, the ratio $d/f_0$ is preferably less than 0.1 and most preferably less than 0.05. Increasing the $d/f_0$ ratio above 0.1 is undesirable since it leads to unacceptably high levels of lateral color. For the projection lenses of FIGS. 1 and 2, this ratio is approximately 0.01.

The DOS can be made using a variety of techniques now known or subsequently developed. Examples of such techniques including machining of individual elements using, for example, a diamond turning machine or, more preferably, producing a master mold and forming elements having the desired diffractive surface using injection molding techniques. Binary approximations to a DOS surface can be produced using photolithography techniques known in the art. Elements having diffractive optical surfaces, especially when made by molding, will generally be composed of a plastic material, e.g., an acrylic polymer, although other materials, e.g., glass materials, can be used if desired.

Figure 3:
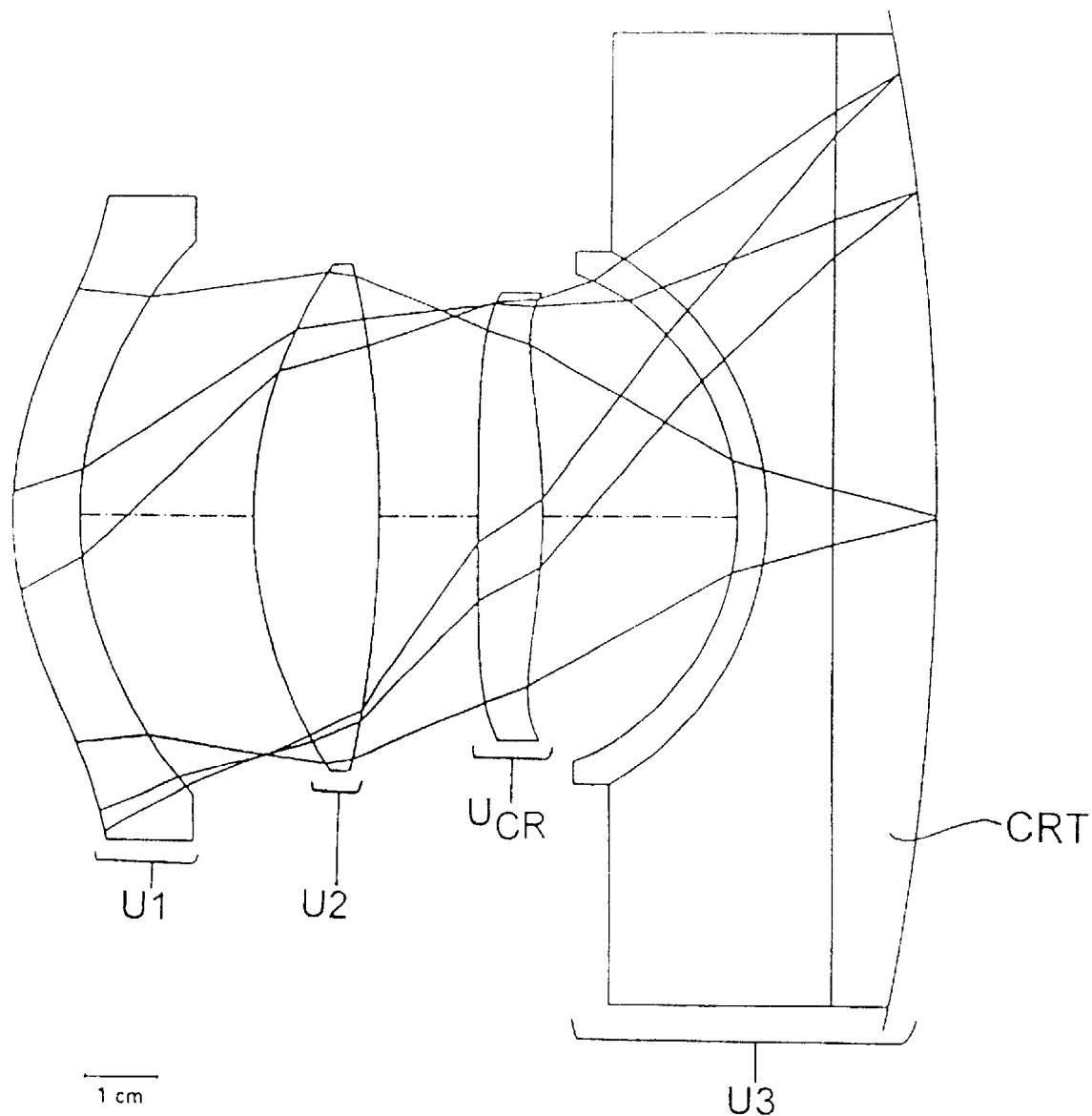
FIG. 3 is a schematic side view of a lens system having a comparable construction to the lens systems of FIGS. 1 and 2, but without a diffractive optical surface.

FIGS. 1–2 illustrate various projection lenses constructed in accordance with the invention. FIG. 3 shows a projection lens having a comparable construction to the lens systems of FIGS. 1 and 2, but without a diffractive optical surface. Corresponding prescriptions appear in Tables 1–3. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero for the prescriptions of Tables 1–3.

The designation "a" associated with various surfaces in the tables represents an aspheric surface, i.e., a surface for which at least one of D, E, F, G, H, or I in the above equation is not zero. All dimensions given in the tables are in millimeters. Tables 1–3 are constructed on the assumption that light travels from left to right in the figures. In actual practice, the viewing screen will be on the left and the CRT will be on the right, and light will travel from right to left.

The CRT faceplate constitutes surfaces 13–14 in Tables 1–2 and surfaces 11–12 in Table 3. A coupling fluid is located between surfaces 12–13 in Tables 1–2 and surfaces 10–11 in Table 3. The material designations for these components are set forth as six digit numbers in the tables, where a $N_e$ value for the material is obtained by adding 1,000 to the first three digits of the designation, and a $V_e$ value is obtained from the last three digits by placing a decimal point before the last digit. The asterisks in Tables 1 and 2 represent the index of refraction and the Abbe numbers used in the Sweatt model for the DOS, i.e., a $N_e$ value of 9999 and a $V_e$ value of −3.4.

In Table 1, the first lens unit comprises surfaces 1–2, the second lens unit comprises surfaces 4–5, the DOE comprises surfaces 6–8, the corrector lens unit comprises surfaces 9–10, and the third lens unit comprises surfaces 11–14. Surface 3 is an optional vignetting aperture.

In Table 2, the first lens unit comprises surfaces 1–2, the second lens unit comprises surfaces 3–4, the DOE comprises surfaces 5–7, the corrector lens unit comprises surfaces 9–10, and the third lens unit comprises surfaces 11–14. Surface 8 is an optional vignetting aperture.

Table 6 summarizes various properties of the lens systems of the invention. As shown therein, the lens systems of Tables 1–2 have the various preferred properties referred to above. In this table, the designation "½w" represents the half field of view of the lens system.

FIGS. 4 and 5 compare the chromatic aberration of the lenses of FIGS. 1 and 2 which employ the invention with the chromatic aberration of the lens of FIG. 3 which has a comparable construction but without a DOS. As can be seen in these figures, the DOS substantially reduces the chromatic aberration of the system. The calculated monochromatic optical transfer functions (not shown) for the lenses of FIGS. 1 and 2 were comparable to those for the lens of FIG. 3.

The projection lens of Table 1 was prepared and tested. In one test, the DOS was a 16-level binary approximation kinoform prepared using photolithography techniques. In another test, the DOE was a blazed kinoform prepared by diamond turning. In both cases, the projection lenses were found to work successfully except that they exhibited a somewhat lower than desired level of contrast. Some of this contrast loss is believed to be due to the fact that the kinoforms were not made perfectly. Another source of contrast loss is believed to be the extent of the spectral range over which the lens had reduced axial color, i.e., 480 to 640 nanometers.

Figure 6:
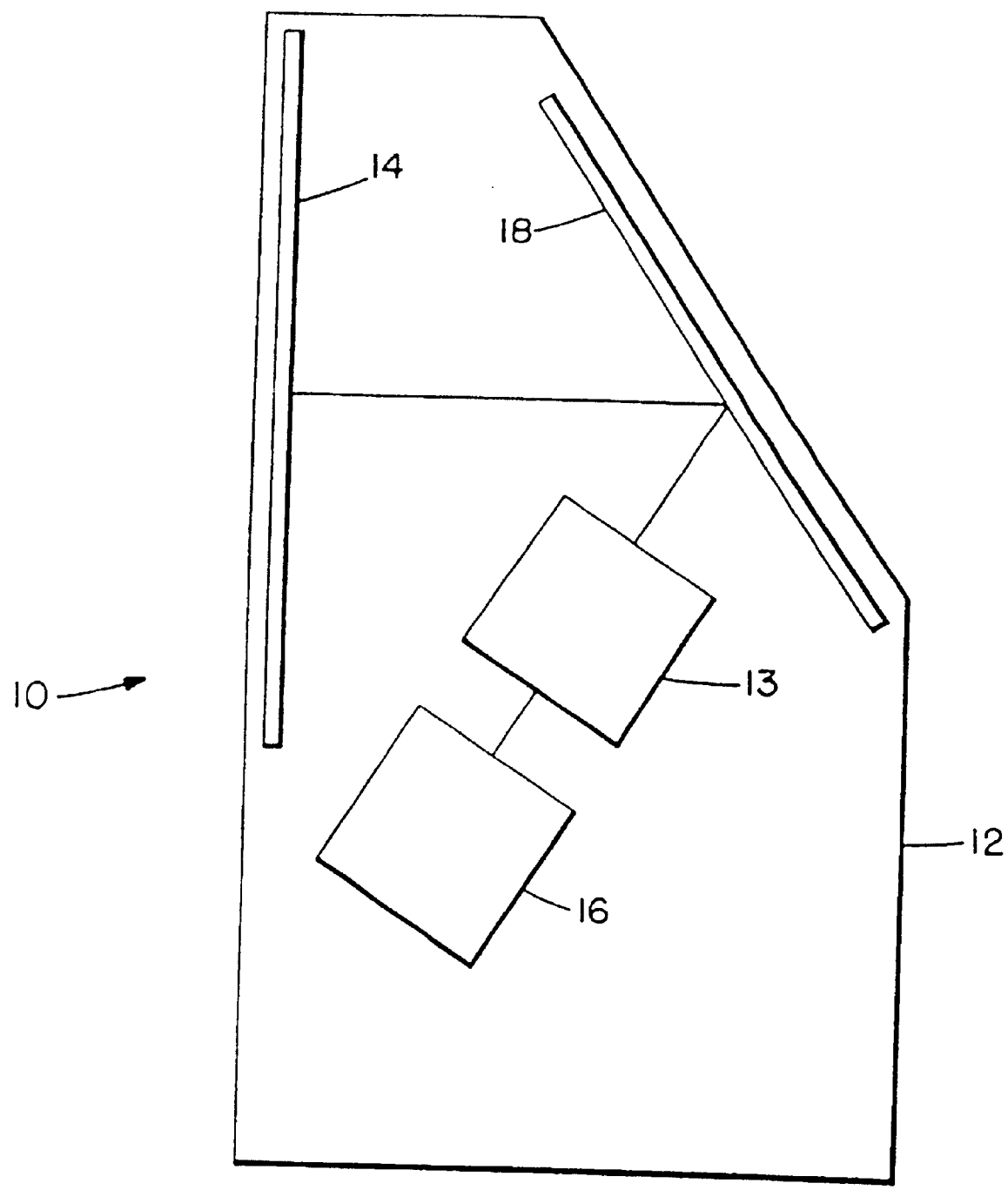
FIG. 6 is a schematic diagram of a rear projection TV employing a lens system constructed in accordance with the invention.

FIG. 6 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 55.6214 | 9.00000 | ACRYLIC | 86.77 |
| 2 | a | 55.9468 | 22.11697 | | 74.61 |
| 3 | | ∞ | 0.00000 | | 68.19 |
| 4 | | 63.9494 | 18.00000 | BACD5 | 67.59 |
| 5 | | −134.1724 | 1.00000 | | 66.45 |
| 6 | | ∞ | 0.00500 | ****** | 62.17 |
| 7 | | ∞ | 6.00000 | ACRYLIC | 62.17 |
| 8 | | ∞ | 9.48017 | | 58.89 |
| 9 | a | −903.7057 | 8.00000 | ACRYLIC | 58.91 |
| 10 | a | −96.6566 | Space 1 | | 59.68 |
| 11 | a | −40.3999 | 4.00000 | ACRYLIC | 65.57 |
| 12 | | −42.6000 | 9.00000 | 432500 | 71.72 |
| 13 | | 28 | 14.10000 | 562500 | 130.00 |
| 14 | | −350.0000 | Image distance | | 130.00 |

Symbol Description
a-Polynomial asphere

Object and Image Surface

| Surface | Radius |
|---|---|
| Image | −350.0000 |

Even Polynomial Aspheres

| Surf. No. | D | E | F | G | H | I |
|---|---|---|---|---|---|---|
| 1 | −1.2325E-06 | −7.5049E-10 | −2.7130E-13 | −4.1105E-16 | 4.4689E-19 | −1.0050E-22 |
| 2 | −2.1192E-07 | 3.0589E-11 | −1.9537E-13 | −1.3666E-15 | 1.4025E-18 | −3.2263E-22 |
| 9 | 9.1273E-07 | 1.9563E-09 | 2.4017E-12 | −2.9884E-15 | 1.2489E-18 | −1.2894E-22 |
| 10 | 2.3025E-06 | 3.1721E-09 | −6.1199E-12 | 1.9111E-14 | −2.0515E-17 | 7.8340E-21 |
| 11 | −9.3441E-06 | 3.6121E-08 | −7.8947E-11 | 9.0452E-14 | −5.1506E-17 | 1.0853E-20 |

Variable Spaces

| Zoom Pos. | Space 1 T(10) | Focal Shift | Image Distance |
|---|---|---|---|
| 1 | 27.225 | −0.077 | 0.000 |
| 2 | 26.526 | 0.080 | 0.000 |

First-Order Data

| | | |
|---|---|---|
| f/number | 1.29 | 1.27 |
| Magnification | −0.1167 | −0.1013 |
| Object Height | −584.28 | −673.15 |
| Object Distance | −672.07 | −769.94 |
| Effective Focal Length | 71.134 | 71.629 |
| Image Distance | 0.00 | 0.00 |
| Overall Length | 800.00 | 897.17 |
| Forward Vertex Distance | 127.93 | 127.23 |
| Barrel Length | 127.93 | 127.23 |
| Stop Surface Number | 4 | 4 |
| Distance to Stop | 18.39 | 18.39 |
| Stop Diameter | 65.166 | 65.205 |
| Entrance Pupil Distance | 46.271 | 46.271 |
| Exit Pupil Distance | −54.690 | −54.331 |

TABLE 1-continued

First Order Properties of Elements

| Element Number | Surface Numbers | | Power | f |
|---|---|---|---|---|
| 1 | 1 | 2 | 0.52370E-03 | 1900.5 |
| 2 | 4 | 5 | 0.13195E-01 | 75.786 |
| 5 | 9 | 10 | 0.45771E-02 | 218.48 |
| 6 | 11 | 12 | -0.25187E-03 | -3970.3 |
| 7 | 12 | 13 | -0.10141E-01 | -98.611 |
| 8 | 13 | 14 | 0.16057E-02 | 622.78 |

TABLE 2

| Surf. No. | Type | Radius | Thickness | Glass | Clear Aperture Diameter |
|---|---|---|---|---|---|
| 1 | a | 48.2124 | 6.00000 | ACRYLIC | 86.51 |
| 2 | a | 48.8057 | 26.68512 | | 76.70 |
| 3 | | 62.2295 | 18.00000 | BACD5 | 68.70 |
| 4 | | -170.9164 | 1.00000 | | 67.35 |
| 5 | | ∞ | 0.00500 | ****** | 63.81 |
| 6 | | ∞ | 6.00000 | ACRYLIC | 63.81 |
| 7 | | ∞ | 6.60000 | | 60.54 |
| 8 | | ∞ | 3.91941 | | 58.16 |
| 9 | a | -1279.6190 | 7.00000 | ACRYLIC | 61.57 |
| 10 | a | -94.3146 | Space 1 | | 61.24 |
| 11 | a | -43.9745 | 4.00000 | ACRYLIC | 67.01 |
| 12 | | -44.0000 | 9.00000 | 432500 | 73.18 |
| 13 | | 28 | 14.10000 | 562500 | 113.98 |
| 14 | | -350.0000 | Image distance | | 124.74 |

Symbol Description
a-Polynomial asphere

Object and Image Surface

| Surface | Radius |
|---|---|
| Image | -350.0000 |

Even Polynomial Aspheres

| Surf. No. | D | E | F | G | H | I |
|---|---|---|---|---|---|---|
| 1 | -1.3620E-06 | -3.0451E-11 | -1.6856E-12 | -9.8743E-17 | 6.9042E-19 | -2.0047E-22 |
| 2 | -4.0532E-07 | 5.7926E-10 | -1.6747E-12 | -7.2393E-16 | 1.2554E-18 | -2.8790E-22 |
| 9 | 1.4074E-06 | -6.4383E-10 | 8.5939E-12 | -8.5760E-15 | 5.1244E-18 | -1.6711E-21 |
| 10 | 2.1954E-06 | 4.1546E-09 | -6.3741E-12 | 1.7081E-14 | -1.4451E-17 | 4.3058E-21 |
| 11 | -8.8062E-06 | 3.1881E-08 | -7.2816E-11 | 8.6836E-14 | -5.1853E-17 | 1.1727E-20 |

Variable Spaces

| Zoom Pos. | Space 1 T(10) | Focal Shift | Image Distance |
|---|---|---|---|
| 1 | 27.960 | -0.361 | 0.001 |
| 2 | 27.243 | -0.205 | 0.000 |

First-Order Data

| | | |
|---|---|---|
| f/number | 1.27 | 1.26 |
| Magnification | -0.1167 | -0.1013 |
| Object Height | -584.20 | -673.10 |
| Object Distance | -660.93 | -767.93 |
| Effective Focal Length | 71.548 | 72.003 |
| Image Distance | 0.53677E-03 | 0.43109E-03 |
| Overall Length | 800.20 | 897.48 |
| Forward Vertex Distance | 130.27 | 129.55 |
| Barrel Length | 130.27 | 129.55 |
| Stop Surface Number | 4 | 4 |
| Distance to Stop | -0.75 | -0.75 |
| Stop Diameter | 65.234 | 64.831 |

TABLE 2-continued

| | | |
|---|---|---|
| Entrance Pupil Distance | 46.909 | 46.909 |
| Exit Pupil Distance | −57.231 | −56.848 |

First Order Properties of Elements

| Element Number | Surface Numbers | | Power | f |
|---|---|---|---|---|
| 1 | 1 | 2 | 0.54070E-03 | 1849.5 |
| 2 | 3 | 4 | 0.12592E-01 | 79.414 |
| 5 | 9 | 10 | 0.48590E-02 | 205.80 |
| 6 | 11 | 12 | −0.33091E-03 | 3022.0 |
| 7 | 12 | 13 | −0.98182E-02 | −101.85 |
| 8 | 13 | 14 | 0.16057E-02 | 622.78 |

TABLE 3

| Surf. No. | Type | Radius | Thickness | Glass | Clear Aperture Diameter |
|---|---|---|---|---|---|
| 1 | a | 52.8412 | 9.00000 | ACRYLIC | 87.52 |
| 2 | a | 53.6487 | 23.92789 | | 74.93 |
| 3 | | ∞ | 0.00000 | | 67.51 |
| 4 | | 62.3370 | 18.00000 | BACD5 | 68.53 |
| 5 | | −151.5454 | 8.00000 | | 67.34 |
| 6 | | ∞ | 5.71170 | | 57.52 |
| 7 | a | 1639.1639 | 9.00000 | ACRYLIC | 59.76 |
| 8 | a | −97.1935 | Space 1 | | 60.26 |
| 9 | a | −40.3999 | 4.00000 | ACRYLIC | 65.82 |
| 10 | | −42.6000 | 9.00000 | 432500 | 72.01 |
| 11 | | ∞ | 14.10000 | 562500 | 130.00 |
| 12 | | −350.0000 | Image distance | | 130.00 |

Symbol Description
a-Polynomial asphere

Object and Image Surface

| Surface | Radius |
|---|---|
| Image | −350.0000 |

Even Polynomial Aspheres

| Surf. No. | D | E | F | G | H | I |
|---|---|---|---|---|---|---|
| 1 | −8.3461E-07 | −5.6730E-10 | −4.5333E-13 | −4.3712E-16 | 4.7297E-19 | −1.0474E-22 |
| 2 | 4.0601E-07 | −2.8649E-10 | 2.6176E-14 | −1.3875E-15 | 1.2042E-18 | −2.3346E-22 |
| 7 | 6.6165E-07 | 0.2944E-10 | 3.2892E-12 | −3.1069E-15 | 1.2133E-18 | −1.0162E-23 |
| 8 | 1.8506E-06 | 2.9676E-09 | −6.7252E-12 | 1.9458E-14 | −1.9846E-17 | 7.6258E-21 |
| 9 | −0.3441E-06 | 3.6121E-08 | −7.8947E-11 | 9.0452E-14 | −5.1506E-17 | 1.0853E-20 |

Variable Spaces

| Zoom Pos. | Space 1 T(8) | Focal Shift | Image Distance |
|---|---|---|---|
| 1 | 27.305 | −0.088 | 0.000 |
| 2 | 26.612 | 0.080 | 0.000 |

First-Order Data

| | | |
|---|---|---|
| f/number | 1.29 | 1.25 |
| Magnification | −0.1167 | −0.1013 |
| Object Height | −584.28 | −673.15 |
| Object Distance | −671.98 | −770.12 |
| Effective Focal Length | 71.364 | 71.857 |
| Image Distance | 0.00 | −10587E-03 |
| Overall Length | 800.02 | 897.47 |
| Forward Vertex Distance | 128.04 | 127.35 |
| Barrel Length | 128.04 | 127.35 |
| Stop Surface Number | 4 | 4 |
| Distance to Stop | 18.61 | 18.61 |
| Stop Diameter | 64.262 | 66.019 |

TABLE 3-continued

| | | |
|---|---|---|
| Entrance Pupil Distance | 49.132 | 40.132 |
| Exit Pupil Distance | −54.667 | −54.311 |

First Order Properties of Elements

| Element Number | Surface Numbers | | Power | f' |
|---|---|---|---|---|
| 1 | 1 | 2 | 0.65884E-03 | 1517.8 |
| 2 | 4 | 5 | 0.12971E-01 | 77.093 |
| 3 | 7 | 8 | 0.53724E-02 | 186.14 |
| 4 | 9 | 10 | −0.25187E-03 | −3970.3 |
| 5 | 10 | 11 | −0.10141E-01 | −98.611 |
| 6 | 11 | 12 | 0.16057E-02 | 622.78 |

TABLE 4

Figure 4A:
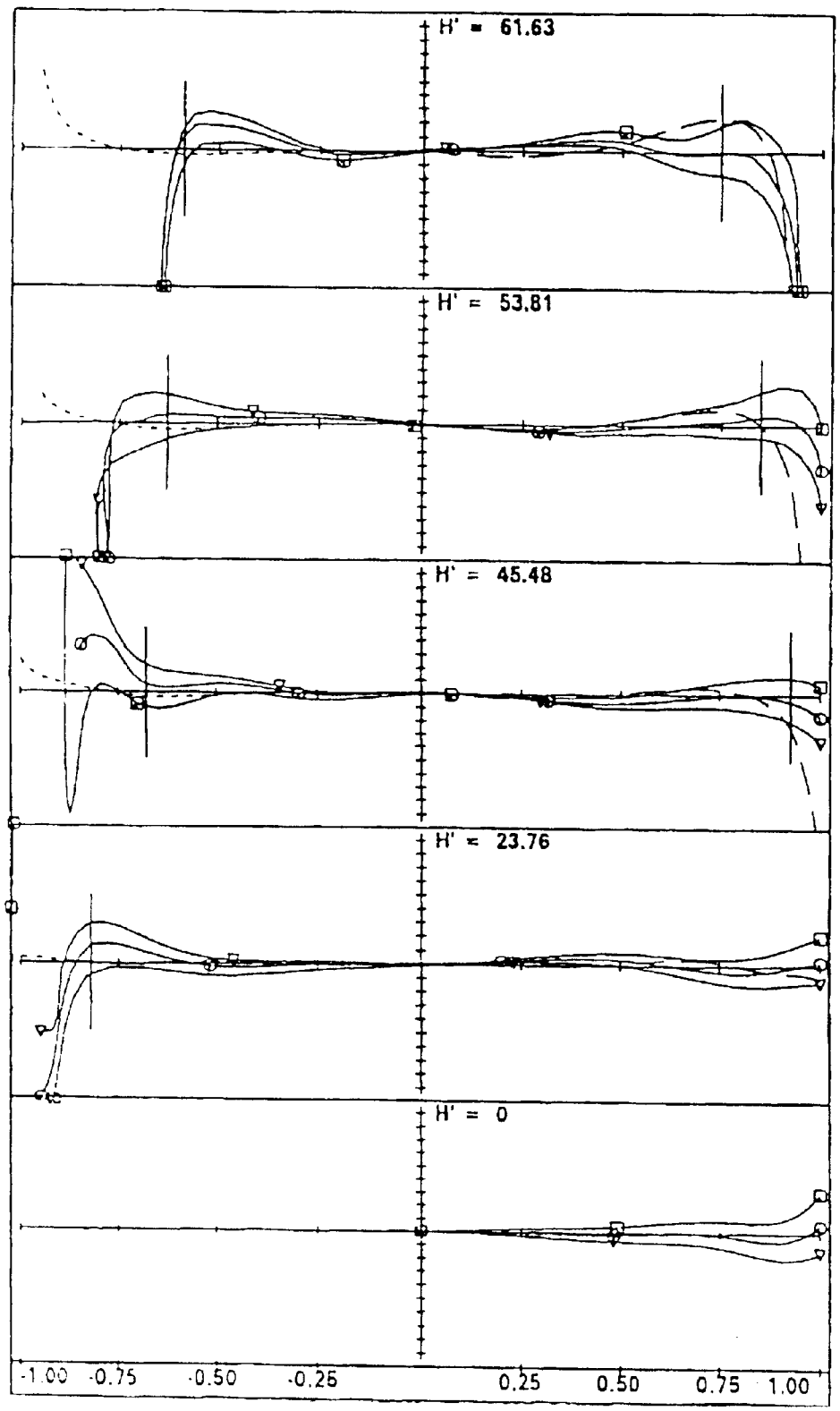
FIGS. 4A, 4B, and 4C are calculated plots of lateral aberration versus relative entrance pupil coordinates for the lenses of FIGS. 1, 2, and 3, respectively, for an image to object magnification of −0.117. The parameters for these figures appear in Table 4.
Figure 4B:
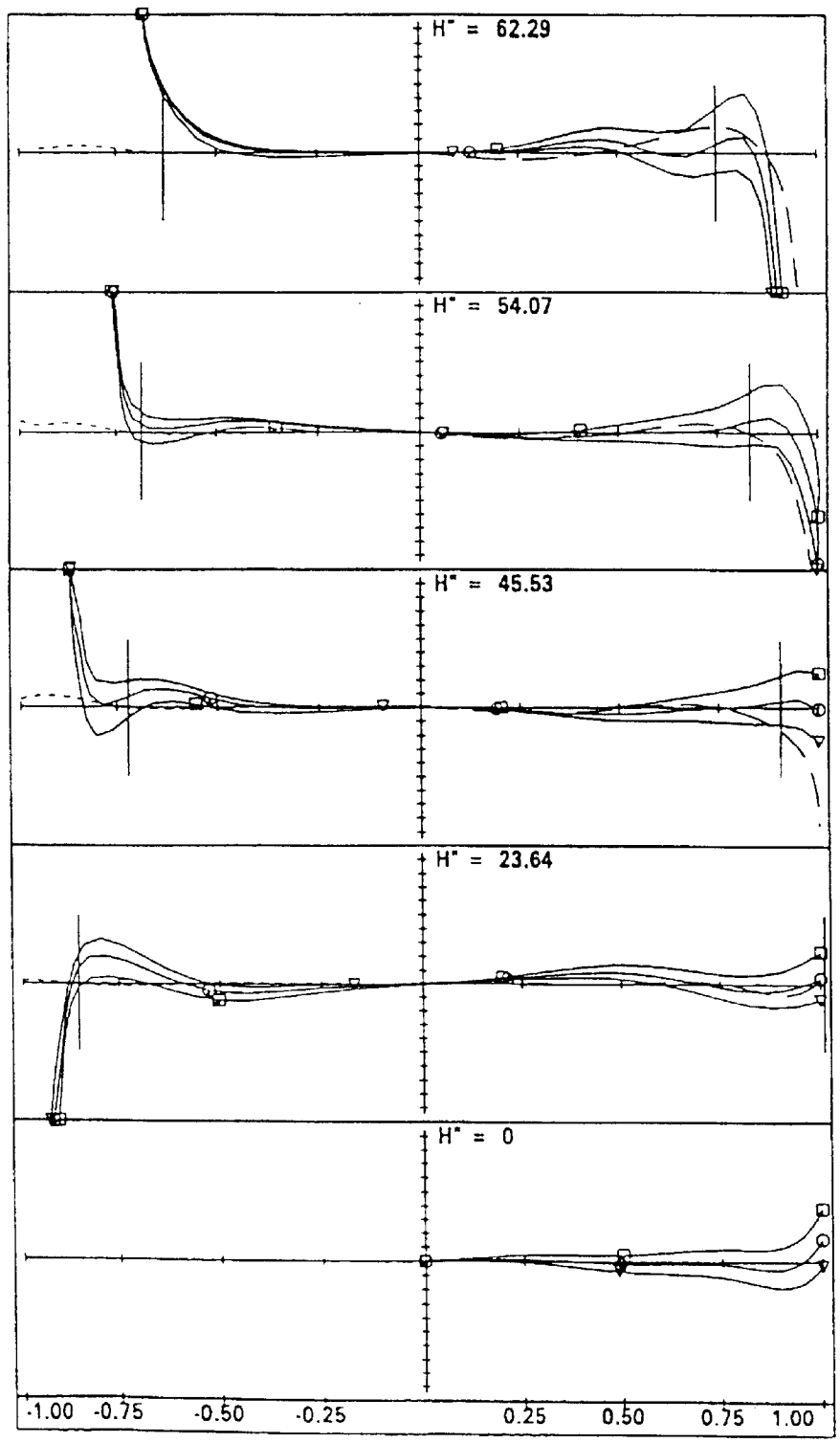
Figure 4C:
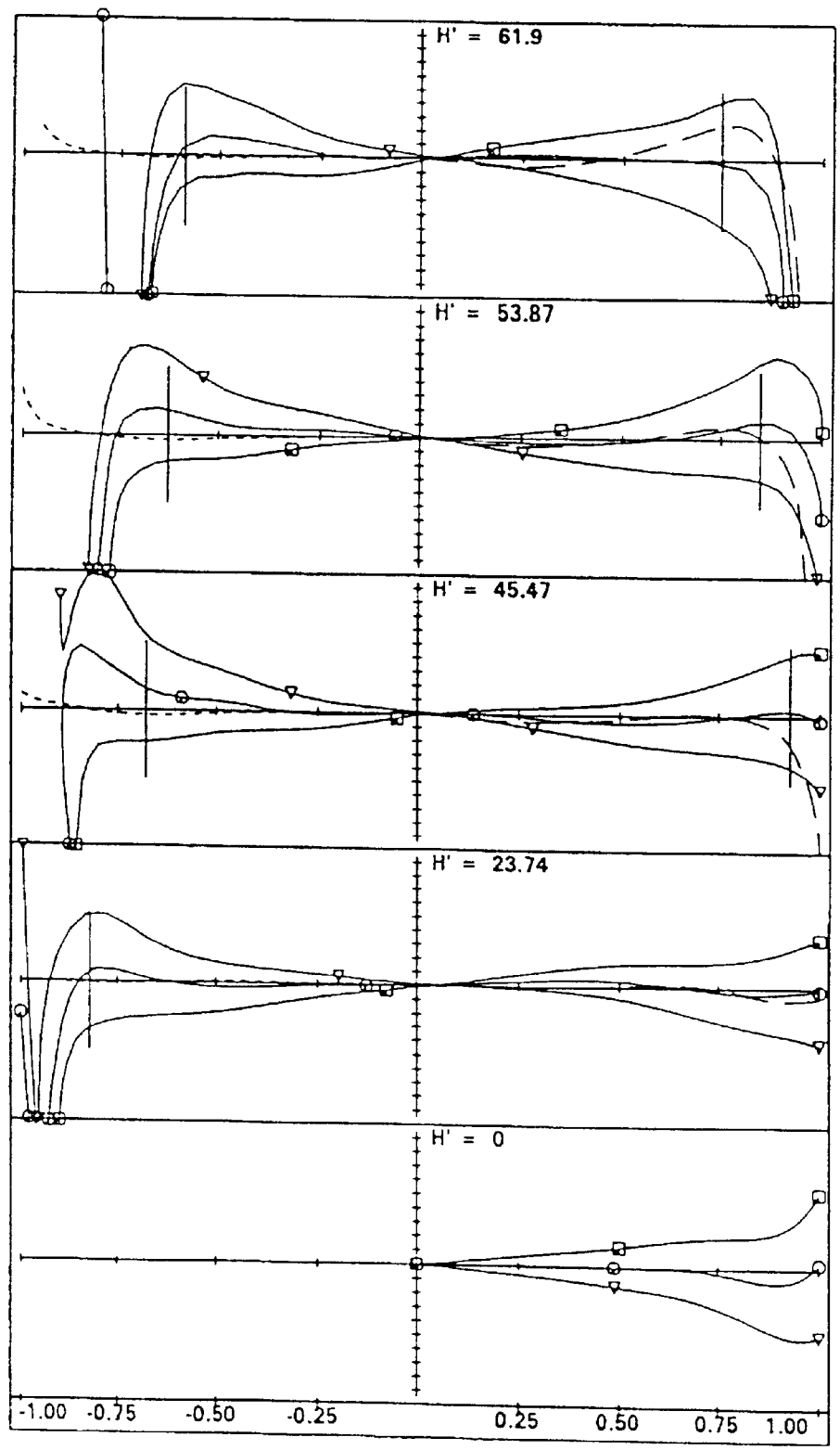

| | FIG. 4A | FIG 4B | FIG. 4C |
|---|---|---|---|
| Focal length | 71.13 | 71.55 | 71.36 |
| Magnification | −0.117 | −0.117 | −0.117 |
| f/ number | 1.29 | 1.27 | 1.29 |
| Image height | −584.28 | −584.20 | −584.28 |
| Object height | 61.64 | 62.30 | 61.90 |

TABLE 5

Figure 5A:
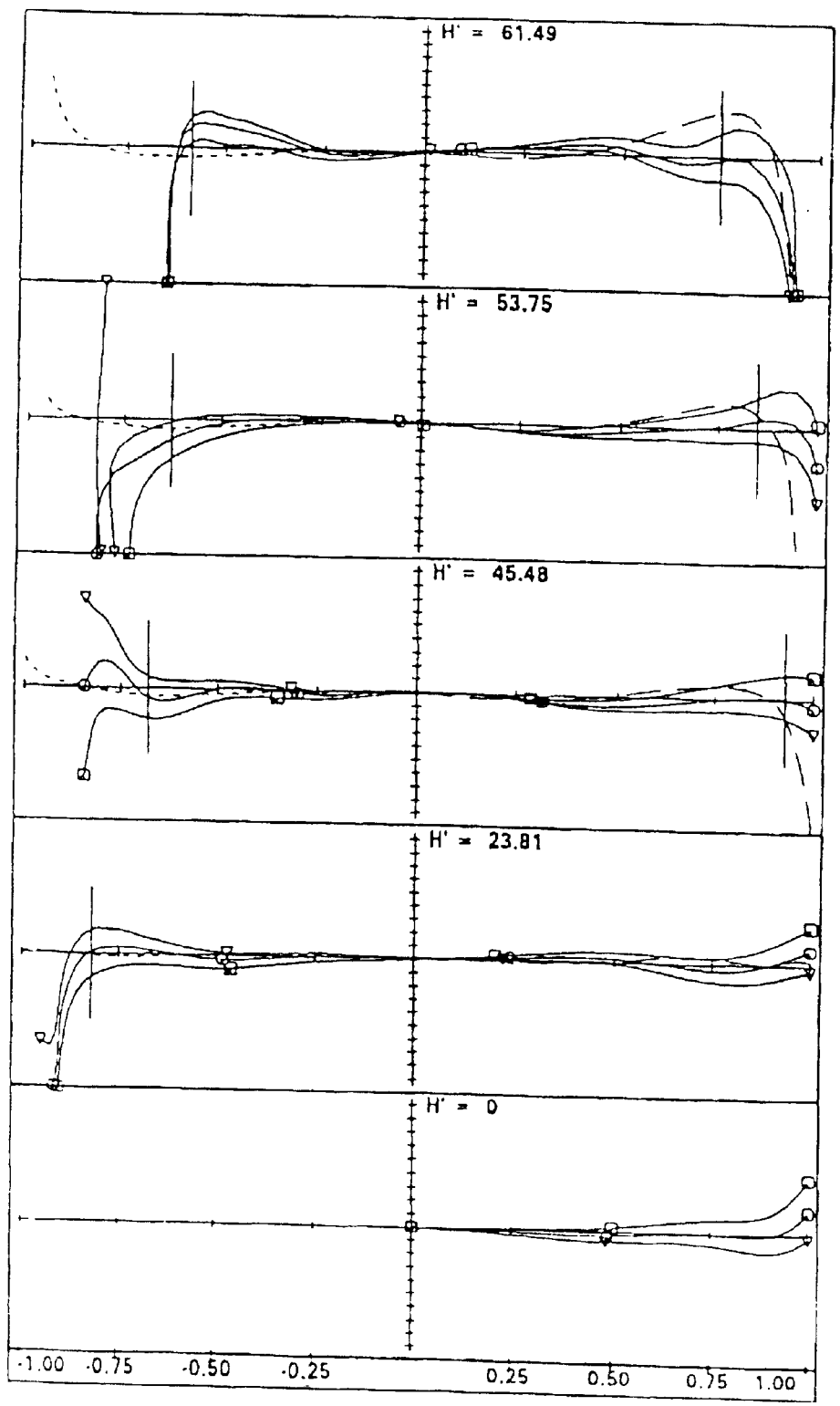
FIGS. 5A, 5B, and 5C are calculated plots of lateral aberration versus relative entrance pupil coordinates for the lenses of FIGS. 1, 2, and 3, respectively, for an image to object magnification of −0.101. The parameters for these figures appear in Table 5.
Figure 5B:
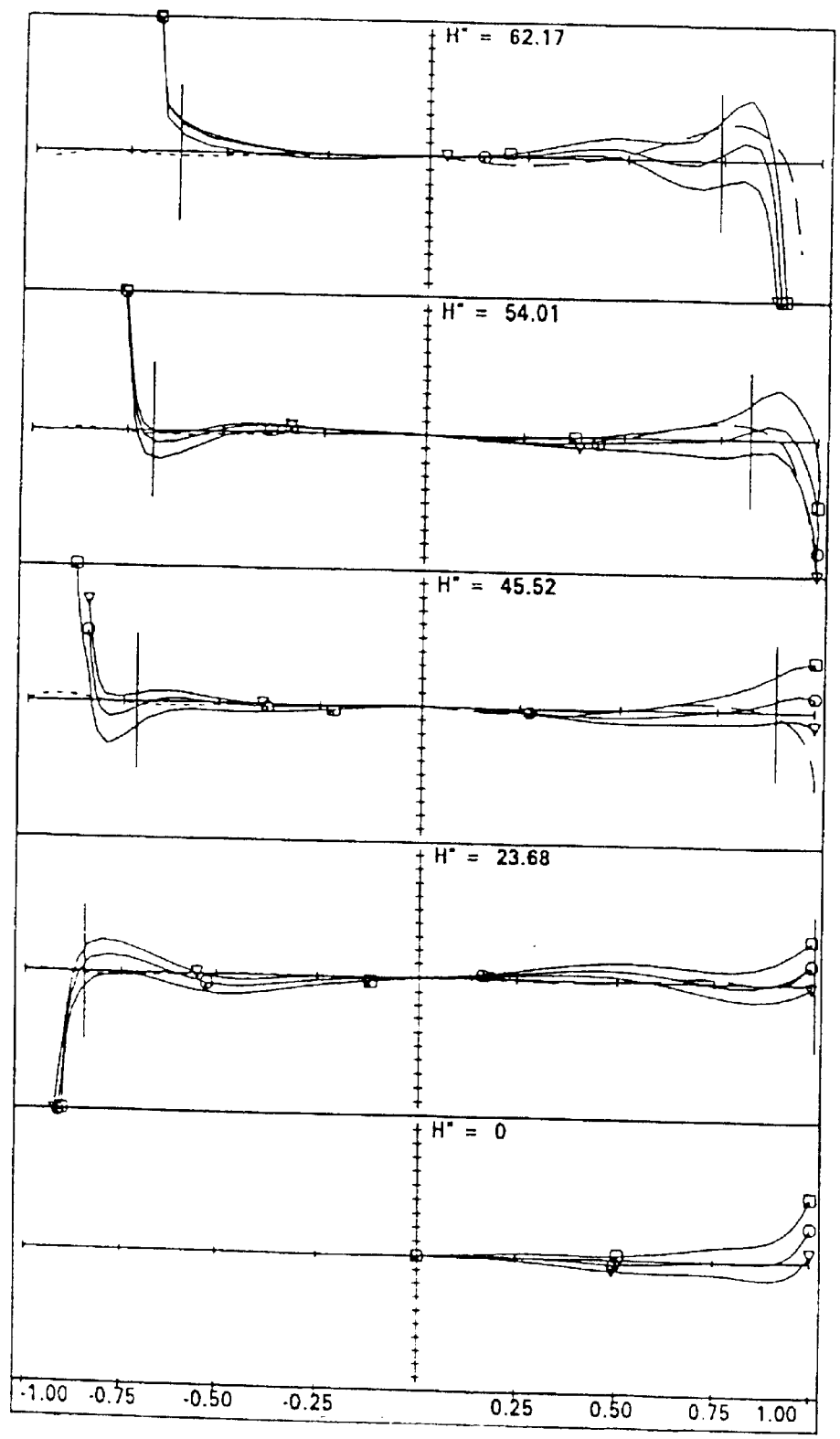
Figure 5C:
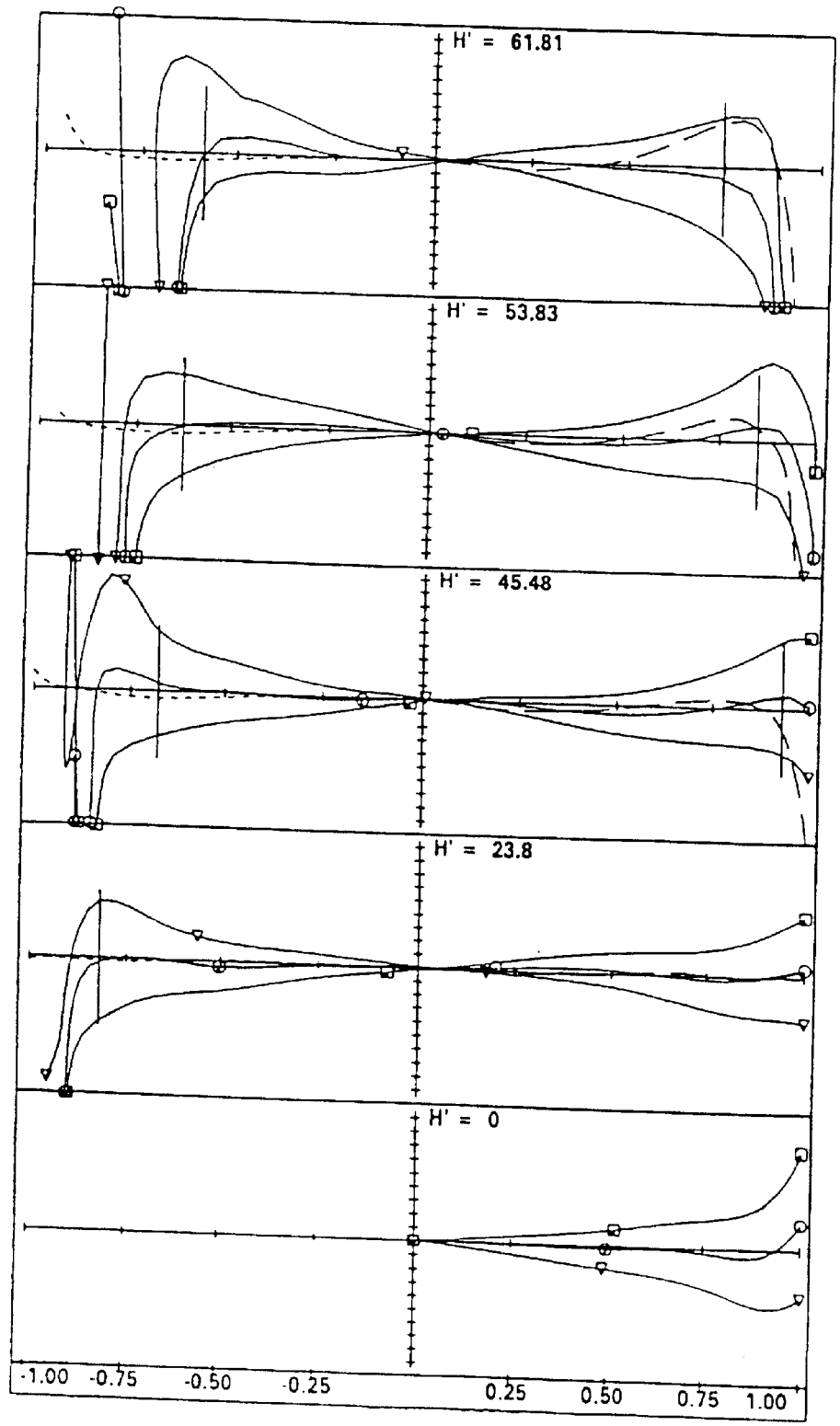

| | FIG. 5A | FIG. 5B | FIG. 5C |
|---|---|---|---|
| Focal length | 71.63 | 72.00 | 71.86 |
| Magnification | −0.101 | −0.101 | −0.101 |
| f/ number | 1.27 | 1.26 | 1.25 |
| Image height | −673.15 | −673.10 | −673.15 |
| Object height | 61.50 | 62.18 | 61.81 |

TABLE 6

| Ex. No. | f0 | f1 | f2 | fcr | f3 | $f_{DOE}$ | 1/2 w |
|---|---|---|---|---|---|---|---|
| 1 | 71.13 | 1909.5 | 75.79 | 218.48 | −113.60 | 2000.0 | 40.5° |
| 2 | 71.55 | 1849.5 | 79.41 | 205.80 | −126.78 | 2000.0 | 40.2° |

What is claimed is:

1. A projection lens system for use with a cathode ray tube, said projection lens system having a long conjugate side and a short conjugate side and comprising in order from its long conjugate side:

(a) a first lens unit which primarily corrects aperture dependent aberrations, said first lens unit having a short conjugate side and comprising at least one aspherical surface;

(b) a second lens unit having a positive optical power;

(c) a corrector lens unit comprising at least one aspherical surface; and (d) a third lens unit which is associated with the cathode ray tube during use of the lens system and which provides correction for the field curvature of the lens system, said third lens unit having a long conjugate side;

wherein the lens system includes at least one diffractive optical surface which at least partially corrects the axial color of the lens system and which is located between the short conjugate side of the first lens unit and the long conjugate side of the third lens unit.

2. The projection lens system of claim 1 wherein the diffractive optical surface is formed on a diffractive optical element which comprises two optical surfaces, one of said optical surfaces being plano and the other of said optical surfaces being the diffractive optical surface.

3. The projection lens system of claim 1 wherein:
(i) the projection lens system has an aperture stop and a focal length $f_0$, and
(ii) the distance between the diffractive optical surface and the aperture stop is less than $0.1 \cdot f_0$.

4. The projection lens system of claim 3 wherein the distance between the diffractive optical surface and the aperture stop is less than $0.05 \cdot f_0$.

5. A projection television system comprising a cathode ray tube and a projection lens system for projecting light from the cathode ray tube onto a screen to form an image, said projection lens system comprising the projection lens system of claim 1.

6. A projection television system comprising three cathode ray tubes and three projection lens systems, one projection lens system being associated with each of the cathode ray tubes for projecting light from that tube onto a common screen to form an image, each projection lens system comprising the projection lens system of claim 1.

* * * * *

UNITED STATES PATENT AND TRADEMARK OFFICE
CERTIFICATE OF CORRECTION

PATENT NO. : 6,529,336 B1
DATED : March 4, 2003
INVENTOR(S) : Kreitzer, Melvyn H.

It is certified that error appears in the above-identified patent and that said Letters Patent is hereby corrected as shown below:

Column 1,
Line 64, delete "compliment" and insert in place thereof -- complement --.

Column 2,
Line 2, following "consists" insert -- of --.

Column 3,
Line 61, delete "0.1480" and insert in place thereof -- 0.480 --.
Line 65, delete "0.1644" and insert in place thereof -- 0.644 --.

Column 4,
Line 65, delete ", $_{31}$3.4" and insert in place thereof -- , -3.4 --.
Line 66, delete "0.1486" and insert in place thereof -- 0.486 --.
Line 66, delete "0.1656" and insert in place thereof -- 0.656 --.

Column 5,
Line 21, delete "0.1014" and insert in place therefor -- 0.014 --.
Line 22, delete "0.10007" and insert in place thereof -- 0.0007 --.
Line 50, delete "including" and insert in place thereof -- include --.

Column 8,
Line 24, delete "28" and insert in place -- $\infty$ --.

Column 9,
Line 10, delete "1900.5" and insert in place thereof -- 1909.5 --.
Line 30, delete "28" and insert in place thereof -- $\infty$ --.
Line 57, delete "-660.93" and insert in place thereof -- -669.93 --.

Column 11,
Line 15, delete "-0.33091E-03" and insert in place thereof -- 0.33091E-03 --.
Line 46, delete "0.2944E-10" and insert in place thereof -- 9.2944E-10 --.
Line 48, delete "-03.441E-06" and insert in place thereof -- -9.3441E-06 --.
Line 59, delete "-10587E-03" and insert in place thereof -- -.10587E-03 --.

UNITED STATES PATENT AND TRADEMARK OFFICE
CERTIFICATE OF CORRECTION

PATENT NO.      : 6,529,336 B1
DATED           : March 4, 2003
INVENTOR(S)     : Kreitzer, Melvyn H.

It is certified that error appears in the above-identified patent and that said Letters Patent is hereby corrected as shown below:

Column 13,
Line 3, delete "40.132" and insert in place thereof -- 49.132 --.
Line 20, delete "FIG 4B" and insert in place thereof -- FIG. 4B --.
Line 40, delete "f0  f1  f2  fcr  f3" and insert in place thereof -- $f_0$  $f_1$  $f_2$  $f_{cr}$  $f_3$ --.

Signed and Sealed this

Twenty-First Day of October, 2003

JAMES E. ROGAN
*Director of the United States Patent and Trademark Office*